(12) United States Patent
Earnshaw et al.

(10) Patent No.: US 8,582,522 B2
(45) Date of Patent: Nov. 12, 2013

(54) HANDLING PHYSICAL UPLINK SHARED CHANNEL TRANSMISSIONS

(75) Inventors: Mark Earnshaw, Kanata (CA); Youn Hyoung Heo, Suwon (KR); Margarita Datsen, Vaughan (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 182 days.

(21) Appl. No.: 13/250,719

(22) Filed: Sep. 30, 2011

(65) Prior Publication Data

US 2013/0083737 A1 Apr. 4, 2013

(51) Int. Cl.
*H04W 4/00* (2009.01)
*H04B 7/00* (2006.01)
*H04Q 7/20* (2006.01)

(52) U.S. Cl.
USPC .......... 370/329; 370/310; 370/344; 370/465; 455/452.1; 455/452.2

(58) Field of Classification Search
USPC .......... 370/236–329, 344, 465; 455/453, 458, 455/450–452.2; 713/323; 714/748, 749, 714/E11.131
See application file for complete search history.

(56) References Cited

U.S. PATENT DOCUMENTS

| | | | |
|---|---|---|---|
| 8,200,252 B2* | 6/2012 | Lee et al. | 455/458 |
| 2005/0053035 A1* | 3/2005 | Kwak et al. | 370/331 |
| 2008/0146242 A1 | 6/2008 | Alanara et al. | |
| 2008/0304447 A1* | 12/2008 | Kim et al. | 370/329 |
| 2009/0168731 A1 | 7/2009 | Zhang et al. | |
| 2009/0239566 A1* | 9/2009 | Pelletier et al. | 455/517 |
| 2010/0169732 A1* | 7/2010 | Wu | 714/748 |
| 2010/0331037 A1* | 12/2010 | Jen | 455/522 |
| 2011/0021203 A1 | 1/2011 | Yamada et al. | |
| 2013/0039292 A1* | 2/2013 | Liu et al. | 370/329 |
| 2013/0100917 A1* | 4/2013 | Seo et al. | 370/329 |

OTHER PUBLICATIONS

Larmo et al. "The LTE Lin-Layer Design", IEEE Communication Magazine, Apr. 2009 (pp. 52-59).*
TS 36.213, V10.5.0 (Mar. 2012) 3rd Generation Partnership Project; Technical Specification Group Radio Access Network; Evolved Universal Terrestrial Radio Access (E-UTRA); Physical layer procedures (Release 10) 125 pages.
TS 36.321, V10.5.0 (Mar. 2012) 3rd Generation Partnership Project; Technical Specification Group Radio Access Network; Evolved Universal Terrestrial Radio Access (E-UTRA); Medium Access Control (MAC) protocol specification (Release 10); 54 pages.
Larmo, Anna et al.; "The LTE Link-Layer Design"; IEEE Communications Magazine; Apr. 2009; pp. 52-59.
International Search Report and Written Opinion of the International Searching Authority issued in International Application No. PCT/US2012/056089 on Dec. 7, 2012; 9 pages.

* cited by examiner

*Primary Examiner* — Afsar M Qureshi
(74) *Attorney, Agent, or Firm* — Fish & Richardson P.C.

(57) ABSTRACT

Systems, apparatus and methods can be implemented for handling physical uplink shared channel (PUSCH) transmissions. A user equipment (UE) can decode, on a physical hybrid automatic repeat request (HARQ) indicator channel (PHICH), a negative acknowledgement (NACK) associated with an HARQ process. The UE can also receive, from a base station, an uplink grant without an associated transport block. The decoded NACK and the received uplink grant can trigger a respective transmission during a PUSCH transmission opportunity. The UE can then perform, during the PUSCH transmission opportunity, one of transmission of a PUSCH transmission associated with the HARQ process, transmission of control information based on the received uplink grant, or disregarding the decoded NACK and the received uplink grant.

32 Claims, 13 Drawing Sheets

500

5.4.2.2 HARQ process
[...]

To generate a transmission, the HARQ process shall:

- if the MAC PDU was obtained from the Msg3 buffer; or
- if there is no measurement gap at the time of the transmission and, in case of retransmission, the retransmission does not collide with a transmission for a MAC PDU obtained from the Msg3 buffer in this TTI, *and there is not an uplink grant without an associated transport block at the time of the transmission:* ⎫ 510

- instruct the physical layer to generate a transmission according to the stored uplink grant with the redundancy version corresponding to the CURRENT_IRV value;
  - increment CURRENT_IRV by 1;
  - if there is a measurement gap at the time of the HARQ feedback reception for this transmission and if the MAC PDU was not obtained from the Msg3 buffer:
    - set HARQ_FEEDBACK to ACK at the time of the HARQ feedback reception for this transmission.

8.3 UE ACK/NACK procedure

[...]

The physical layer in the UE shall deliver indications to the higher layers as follows:

*If there is an uplink grant without an associated transport block (as defined in Section 8), then ACK shall be delivered to the higher layers regardless of whether or not a transport block was actually transmitted in the preceding associated PUSCH subframe. Otherwise, for downlink subframe i, if a transport block* ⤴ 810
was transmitted in the associated PUSCH subframe then:

- if ACK is decoded on the PHICH in subframe i, ACK shall be delivered to the higher layers;
- else NACK shall be delivered to the higher layers.

5.4.2.2 HARQ process
[...]

NOTE: When a triggered non-adaptive retransmission and an uplink grant without an associated transport block (Section 8.6.2 of [36.213]) occur in the same TTI, the UE may choose which, if any, transmission to proceed with. — 1110

FIG. 11

HANDLING PHYSICAL UPLINK SHARED CHANNEL TRANSMISSIONS

TECHNICAL FIELD

This disclosure relates to wireless communications and, more particularly, to handling physical uplink shared channel (PUSCH) transmissions.

BACKGROUND

Communication networks include wired and wireless networks. Example wired networks include the Public Switched Telephone Network (PSTN) and the Ethernet. Example wireless networks include cellular networks as well as unlicensed wireless networks that connect to wired networks. Calls and other communications may be connected across wired and wireless networks.

Long Term Evolution (LTE) is a wireless communication standard that is standardized by the 3rd Generation Partnership Project (3GPP) as a major fourth generation (4G) communication standard. In LTE, a user equipment (UE) can transmit data and/or control information to the base station on a PUSCH. In some cases, hybrid automatic repeat request (HART) technology can be used in PUSCH transmissions for error correction.

DESCRIPTION OF DRAWINGS

FIG. 5 is a schematic showing a 3GPP standard amendment proposal.

FIG. 8 is a schematic showing another 3GPP standard amendment proposal.

FIG. 11 is a schematic showing another 3GPP standard amendment proposal.

Like reference symbols in the various drawings indicate like elements.

DETAILED DESCRIPTION

Figure 1:
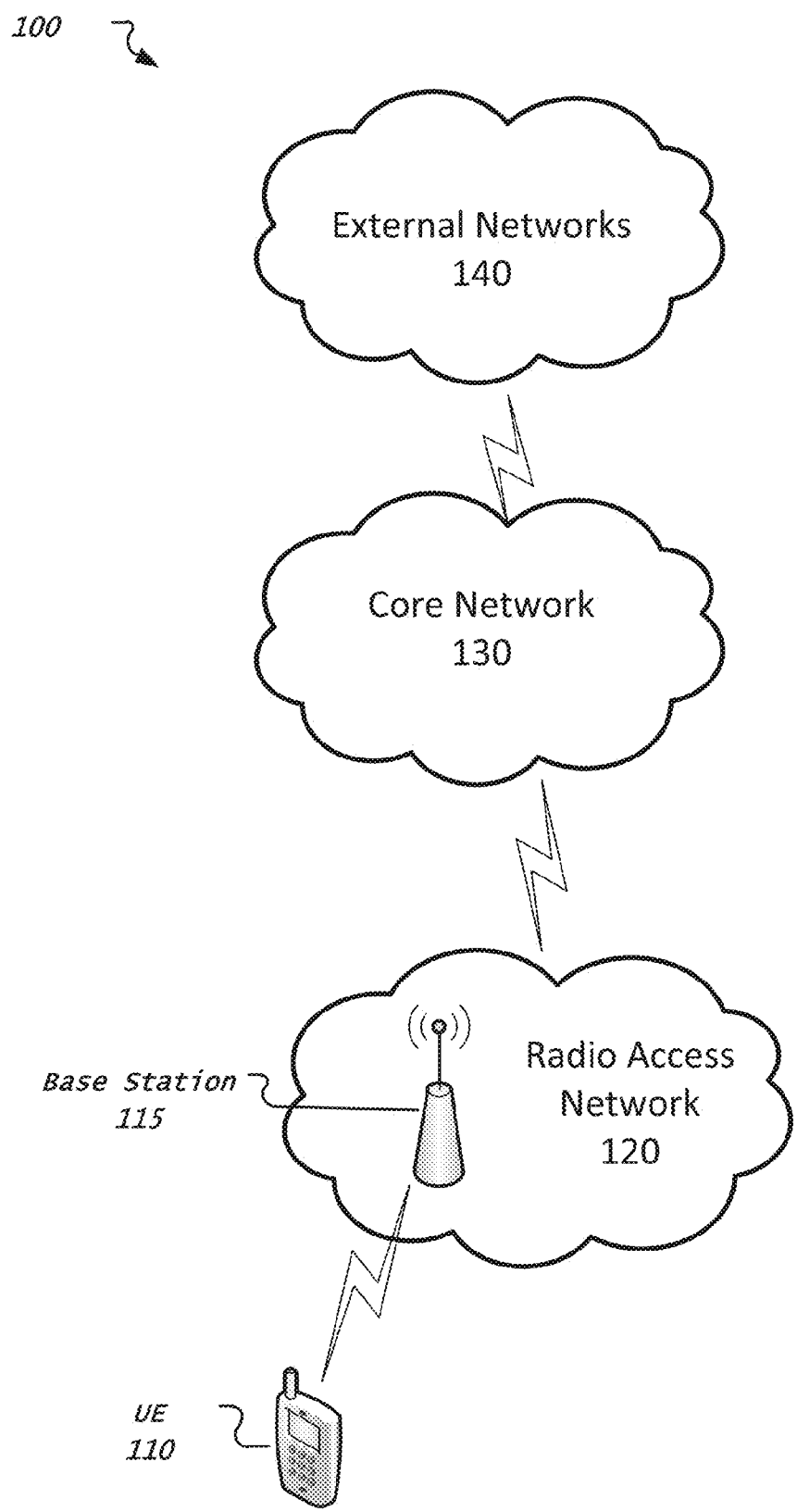
FIG. 1 is a schematic representation of an example wireless cellular communication system.

The present disclosure is directed to systems and methods that handle physical uplink shared channel (PUSCH) transmissions. In wireless telecommunication systems such as 3GPP LTE systems, a user equipment (UE) may use a hybrid automatic repeat request (HARQ) technology to transmit uplink shared channel (UL-SCH) transport blocks. The UL-SCH transport blocks may be transmitted in one or more HARQ processes. Each HARQ process may correspond to one or more PUSCH transmission opportunities. For example, in a frequency division duplex (FDD) LTE system, a UE may transmit UL-SCH transport blocks in 8 HARQ processes, and for each HARQ process, a PUSCH transmission opportunity may occur every 8 milliseconds (ms) or every 8 subframes (i.e., each subframe has a duration of 1 millisecond). At a PUSCH transmission opportunity, the UE may perform new data transmission or adaptive retransmission when an uplink grant is decoded via downlink control information (DCI) format 0 on the physical downlink control channel (PDCCH). Otherwise, the UE may operate based on a state variable HARQ_FEEDBACK associated with the HARQ process. If HARQ_FEEDBACK includes a negative acknowledgement (NACK) value and there is no decoded uplink grant with an associated transport block, a non-adaptive retransmission of a UL-SCH transport block may be triggered at the PUSCH transmission opportunity. If HARQ_FEEDBACK includes the NACK value and there is a decoded uplink grant with an associated transport block, an adaptive retransmission of a UL-SCH transport block may be triggered at the next PUSCH transmission opportunity. The uplink grant can include information associated with physical resources (e.g., radio resource elements) to be used for the corresponding PUSCH transmission. For non-adaptive retransmission, the retransmission may be performed using the same physical resources as the previous transmission of the same UL-SCH transport block. For new data transmission or adaptive retransmission, the retransmission may be performed using the physical resources based on the decoded uplink grant with an associated transport block. If HARQ_FEEDBACK has an ACK (i.e., positive acknowledgement) value, no transmission may be performed at the PUSCH transmission opportunity and the prepared transmission data may be stored in the HARQ buffer.

In some cases, a UE may receive an uplink grant without an associated transport block. For example, the UE may decode a DCI format 0 including all three of the following: (1) a modulation and coding scheme (MCS) index that equals 29, (2) a channel state information (CSI) request bit that is set to 1, and (3) a number of allocated physical resource blocks that is less than or equal to 4, which corresponds to an uplink grant that triggers a control-information-only transmission at a PUSCH transmission opportunity. In some cases, aperiodic channel status information reporting is included as control information. The control-information-only transmission may not include an associated UL-SCH transport block. When the control-information-only transmission is triggered at the same PUSCH transmission opportunity as the non-adaptive retransmission of a UL-SCH transport block, a collision may occur. In order to handle a collision, the UE, upon detection of the collision, may perform either a non-adaptive retransmission or a control-information-only transmission. Alternatively, the UE may perform neither the non-adaptive retransmission nor the control-information-only transmission.

FIG. 1 is a schematic representation of an example wireless cellular communication system 100. The wireless cellular system 100 illustrated in FIG. 1 may be a 3GPP LTE system, also known as Evolved Universal Terrestrial Radio Access (E-UTRA) system. The LTE wireless cellular system 100 includes one or more UEs (one UE 110 is shown), a radio access network (RAN) 120, a core network (CN) 130 and external networks 140 (e.g., IP networks). The RAN 120 further includes one or more base stations (one base station 115 is shown). In LTE wireless cellular system 100, the base station 115 may also be known as an evolved Node B (eNB).

The UE 110 may be any mobile electronic device that is suitable to perform one or more collision handling processes described in the disclosure. Generally, the UE 110 may be used by an end-user to communicate, for example, within the wireless cellular communication system 100. The UE 110 may be referred to as mobile electronic device, mobile device, user device, mobile station, subscriber station, or wireless terminal. UE 110 may be a cellular phone, personal data assistant (PDA), smartphone, laptop, tablet personal computer (PC), or other wireless communications device. Further, UEs 110 may include pagers, portable computers, Session Initiation Protocol (SIP) phones, one or more processors within devices, or any other suitable processing devices capable of communicating information using a radio technology. UE 110 may communicate directly with a base station 115 included in a RAN 120 to receive service when UE 110 is operated within the cell associated with the corresponding base station 115. UE 110 may also receive radio signals from more than one base station 115 included in RAN 120.

In some implementations, UEs 110 may transmit in one or more cellular bands. One or more UEs 110 may be communicably coupled to the RAN 120. In these cases, messages transmitted and/or received by UEs 110 may be based on a multiple access technology. In some implementations, the UEs 110 are configured to use orthogonal frequency division multiple access (OFDMA) technology or single carrier-frequency division multiple access (SC-FDMA) technology to communicate with the base station 115. The UEs 110 may transmit voice, video, multimedia, text, web content and/or any other user/client-specific content. In short, UEs 110 generate requests, responses or otherwise communicate in different means with core network 130 and/or external networks 140 through RAN 120.

Figure 2:
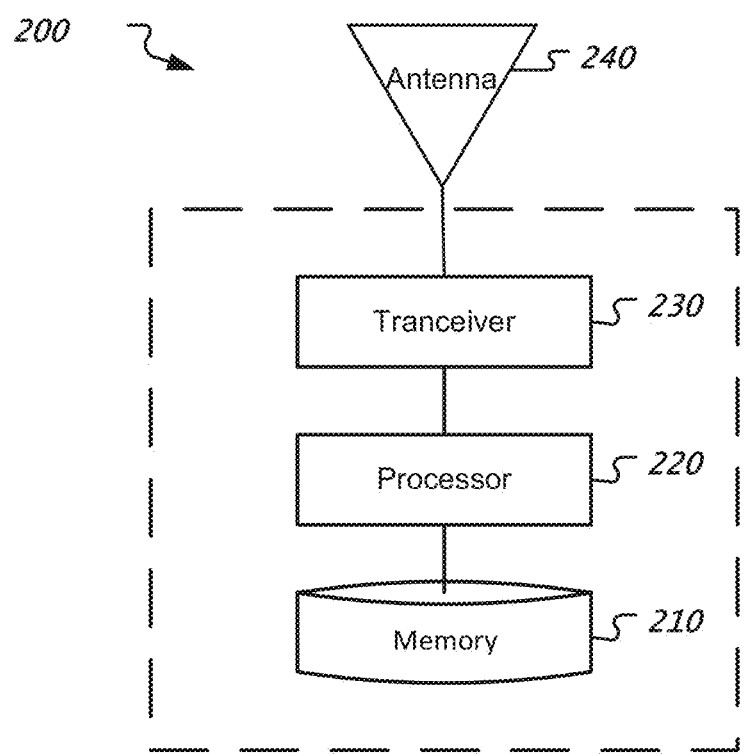
FIG. 2 is a schematic representation of an example architecture of a UE.

Turning briefly to FIG. 2, each UE 110 may be any electronic device operable to receive and transmit wireless signals in the LTE wireless cellular system 100. FIG. 2 is a schematic representation of an example architecture 200 of a UE. The UE 110 may include a processor 220, a memory 210, a wireless transceiver 230 and an antenna 240. The processor 220 may include a microprocessor, a central processing unit, a graphic control unit, a network processor, or other processors for carrying out instructions stored in the memory 210. The functions of the processor 220 may include computation, queue management, control processing, graphic acceleration, video decoding, and execution of a sequence of stored instructions from the program kept in the memory 210. In some implementations, the processor 220 may also be responsible for signal processing including sampling, quantizing, encoding/decoding, and/or modulation/demodulation of the signal. The processor 220 may also be responsible for generating HARQ transmissions/retransmissions and/or control-information-only PUSCH transmissions.

The memory module 210 may include a temporary state device (e.g., random-access memory (RAM)) and data storage. The memory 210 can be used to store data or programs (i.e., sequences of instructions) on a temporary or permanent basis for use in the UE 110. The wireless transceiver 230 can include both the transmitter circuitry and the receiver circuitry. The wireless transceiver 230 may be responsible for up-converting a baseband signal to a passband signal or vice versa. The components of wireless transceiver 230 may include a digital to analog converter/analog to digital converter, amplifier, frequency filter and oscillator. An antenna 240 is a transducer which can transmit and/or receive electromagnetic waves. The antenna 240 can convert electromagnetic radiation into electric current, or vice versa. The antenna 240 is generally responsible for the transmission and reception of radio waves, and can serve as the interface between the transceiver 230 and the wireless channel. In some implementations, the UE 110 and/or the base station 115 may be equipped with multiple antennas to take advantage of the multiple-input-multiple-output (MIMO) technology. The multiple antenna MIMO technology may enable the UE 110 and the base station 115 to set up multiple parallel data streams on the wireless channel, thereby increasing the throughput or reliability of the wireless channel.

Returning to the illustration of FIG. 1, functionally, the UE 110 may be used as a platform for different applications of communications. For example, the UE 110 may be used for interacting with the cellular network by transmitting/receiving signals for initiating, maintaining or terminating the communications the end-user requests. The UE 110 may also include mobility management functions such as performing handovers and reporting a location of the UE 110. The UE 110 performs these mobility management functions based on instructions provided by the cellular network. One exemplary function of the UE 110 may be to provide the user interface to the end-user so that applications such as voice call, data transmission or web browsing may be implemented.

In various embodiments, a RAN 120 in a 3GPP LTE system may be an Evolved Universal Terrestrial Radio Access Network (E-UTRAN). The RAN 120 can be located between the UEs 110 and the CN 130. The RAN 120 includes one or more base stations 115. The base stations 115 may be radio base stations 115 that control one or more radio related functions in a fixed part of the system. The base station 115 may directly communicate to one or more UEs 110, other base stations 115 and/or the CN 130. The base station 115 may be the end point of the radio protocols towards the UEs 110 and may relay signals between the radio connection and the connectivity towards the CN 130. As described above, an enhanced base station in LTE can be referred to as an eNB. An eNB can provide a LTE air interface service and perform radio resource management for E-UTRAN. An eNB may also perform functions performed by other radio network elements in legacy systems (e.g., 2G/3G cellular systems such as Global System for Mobile Communications (GSM) and Universe Mobile Telecommunications System (UMTS) networks). For example, at least a portion of functions of a radio network controller (RNC) may be incorporated in an eNB. Other eNB functionalities may include radio protocol management, mobility management, packet retransmission and header compression.

Figure 3:
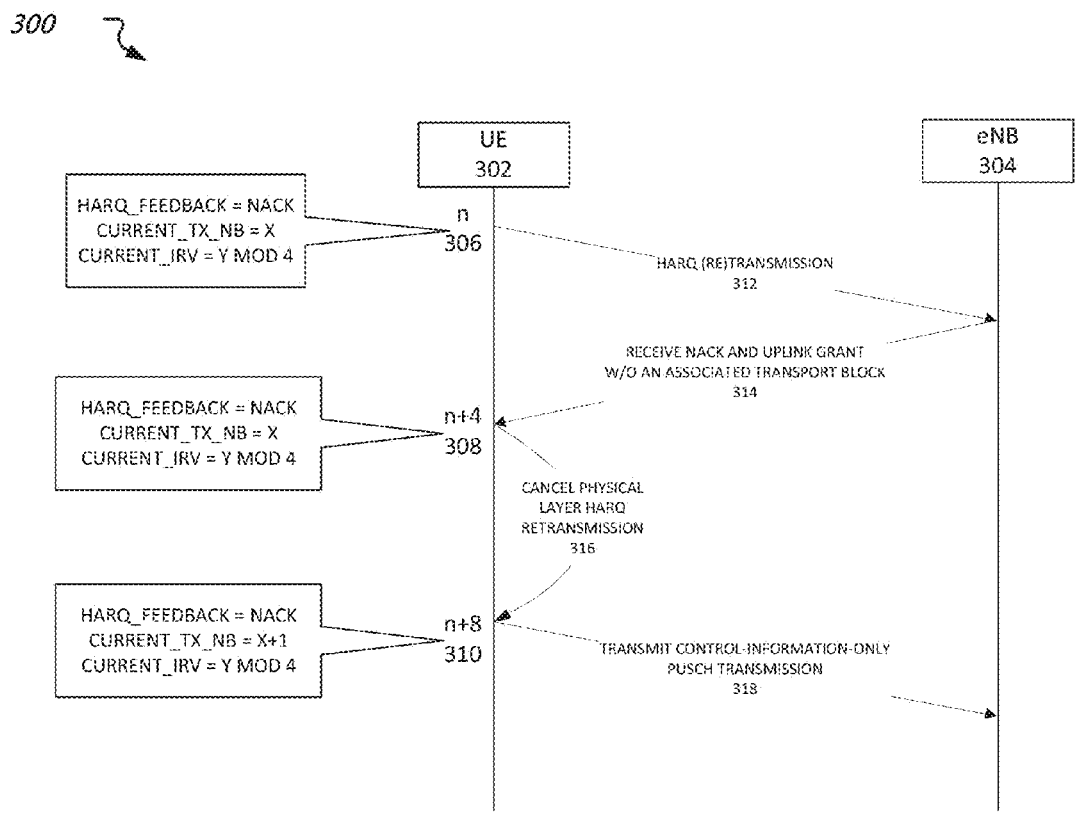
FIG. 3 is a swim lane diagram showing an example collision handling process of colliding PUSCH transmissions.

FIG. 3 is a swim lane diagram showing an example collision handling process 300 of colliding PUSCH transmissions. The example collision handling process 300 is performed by a UE 302 to an eNB 304. The PUSCH transmissions may correspond to an uplink HARQ process associated with the UE 302. Generally, a normal uplink HARQ operation associated with a UE may include 8 uplink HARQ processes for an FDD LTE system. The normal HARQ operation may be, for example, an HARQ operation where a transmission time interval (TTI) bundling is disabled. For an FDD LTE system, each of the 8 uplink HARQ processes can have a transmission opportunity occurring every 8 ms (or every 8 subframes, with each subframe being 1 ms in length). For a time division duplex (TDD) LTE system, the number of uplink HARQ processes and the respective cycle times (i.e., the time period between two consecutive transmission opportunities for the same UL HARQ process) of each uplink HARQ process may be dependent upon the TDD uplink/downlink configuration. FIG. 3 shows a collision handling process 300 that may be executed in an FDD LTE system. It will be understood that similar collision handling processes may also be executed in a TDD LTE system.

UL-SCH operation is defined in the media access control (MAC) layer in 3GPP technical specification 36.321. The UL-SCH is a transport channel. A MAC protocol data unit (PDU) that is carried on the UL-SCH can be referred to as a UL-SCH MAC PDU. The UL-SCH MAC PDU may be transmitted as a transport block at a PUSCH transmission opportunity on the PUSCH. The terms "UL-SCH transport block", "PUSCH transport block", "UL transport block", and "transport block" may be used interchangeably with the term "UL-SCH MAC PDU" in the context of the present disclosure.

In the example collision handling process 300 shown in FIG. 3, at subframe n 306, the UE 302 performs an HARQ transmission/retransmission (referred to as (re)transmission hereinafter) to the eNB 304. The HARQ (re)transmission is associated with an uplink HARQ process. Thus, subframe n 306 is a transmission opportunity of the uplink HARQ process. In some cases, the HARQ (re)transmission may be a new data transmission. The new data transmission may be ordered by reception of an uplink grant on the PDCCH via DCI format 0. In some other cases, the HARQ (re)transmission may be an adaptive retransmission. The adaptive retransmission may also be ordered via reception of a DCI format 0 on the PDCCH. The adaptive retransmission may be performed using different physical resources (as indicated by DCI format 0) as the previous (re)transmission of the uplink HARQ process. In yet some other cases, the HARQ (re)transmission may be a non-adaptive retransmission. The non-adaptive retransmission may be ordered via reception of a NACK on the physical HARQ indicator channel (PHICH). The NACK may be transmitted by the eNB 304 in response to a (re)transmission performed in a preceding transmission opportunity of the uplink HARQ process. The non-adaptive retransmission may be performed using the same physical resources as the previous (re)transmission of the uplink HARQ process. The new data transmission and the adaptive retransmission may have priority over a non-adaptive retransmission. In other words, if a DCI format 0 is received on the PDCCH that indicates a new data transmission or an adaptive retransmission, then a non-adaptive retransmission may not be triggered by a NACK.

A UE may maintain three state variables for each uplink HARQ process, which are: 1) CURRENT_TX_NB, which counts the number of transmission opportunities for the uplink HARQ process. CURRENT_TX_NB is initialized to zero when a new data transmission is made, and is incremented by one for each transmission opportunity, regardless of whether or not an actual UL-SCH transmission is made at the corresponding transmission opportunity. In some cases, when CURRENT_TX_NB reaches a configured threshold corresponding to a maximum number of allowed transmissions (i.e., maxHARQ-Tx for a normal uplink HARQ operation), the transmission buffer of the uplink HARQ process may be flushed; 2) CURRENT_IRV, which is an index that keeps track of the current redundancy version for an HARQ retransmission. CURRENT_IRV is incremented by one (modulo four) for each transmission of a transport block that is actually made on the PUSCH, and cycles through a predefined set of redundancy versions. If an uplink grant is received on a PDDCH via DCI format 0, the redundancy version indicated by the DCI format 0 can be used for the corresponding transmission. The transmission may be either a new data transmission or an adaptive retransmission. A non-adaptive retransmission triggered by a NACK received from an eNB may use the current redundancy version as determined based on CURRENT_IRV; and 3) HARQ_FEEDBACK, which keeps track of the HARQ feedback (either ACK or NACK) of the current uplink HARQ process. At the time of a (re)transmission, HARQ_FEEDBACK is set to NACK, unless the time at which HARQ feedback for the current (re)transmission that is to be received collides with a measurement gap, in which case HARQ_FEEDBACK is set to ACK. If actual HARQ feedback is subsequently received on the PHICH from the eNB, HARQ_FEEDBACK is then set to the value of the received HARQ feedback.

In the example collision handling process 300 shown in FIG. 3, since an HARQ (re)transmission 312 is made by the UE 302 at subframe n 306, HARQ_FEEDBACK is set to NACK. CURRENT_TX_NB is set to an integer X, which corresponds to the number of transmission opportunities counted for the uplink HARQ process, including the transmission opportunity at subframe n 306. CURRENT_IRV is set to Y mod 4, where Y is the number of actual (re)transmissions of the current transport block of the uplink HARQ process that have been performed by the UE 302.

At subframe n+4 308, the UE 302 receives a NACK indicator and an uplink grant without an associated transport block. The NACK indicator may be received based on decoding control information carried on the physical HARQ indicator channel (PHICH). The NACK indicator may be transmitted by the eNB 304 to indicate that a non-adaptive retransmission is requested at the next corresponding transmission opportunity (i.e., subframe n+8 310). The non-adaptive retransmission includes information associated with a UL-SCH MAC PDU of the uplink HARQ process.

The uplink grant without an associated transport block may be received based on decoding control channel elements on the PDCCH DCI format 0. In some cases, the UE may decode from DCI format 0, a modulation and coding scheme (MCS) index that equals 29, a channel state information (CSI) request bit that is set to 1, and a number of allocated physical resource blocks that is less than or equal to four. In such cases, as described with regard to 3GPP technical specification 36.213, there is no transport block for the UL-SCH and the control information feedback is transmitted by the UE. In other words, the eNB 304 may provide the UE 302 with a small uplink grant on the PUSCH in order to provide an aperiodic CSI report on downlink channel conditions. However, the uplink grant may be sufficiently small that an UL-SCH MAC PDU (or transport block) may not be able to be included in the corresponding PUSCH transmission. Therefore, the corresponding PUSCH transmission may be a control-information-only transmission. The uplink grant without an associated transport block may not be reported to the MAC layer, or the uplink HARQ entity. The uplink grant without an associated transport block corresponds to an uplink grant to be used at the next transmission opportunity (i.e., subframe n+8 310) to transmit the CSI report on the PUSCH. The CSI report may include a downlink channel quality indicator (CQI), a rank indicator (RI) and/or a precoding matrix indicator (PMI). Since the UE 302 receives a NACK from the eNB 304, at subframe n+4 308, the value of HARQ_FEEDBACK is still NACK. Since subframe n+4 308 is not a transmission opportunity of the uplink HARQ process, CURRENT_TX_NB value is X and CURRENT_IRV value is still Y mod 4.

Since both a non-adaptive UL-SCH retransmission (triggered by the decoded NACK indicator) and a control-information-only PUSCH transmission (triggered by the uplink grant without an associated transport block) are requested, a collision may occur at subframe n+8 310 between the non-adaptive UL-SCH retransmission and the control-information-only PUSCH transmission. In order to resolve the collision, the UE 302 may cancel the physical layer HARQ retransmission 316. For example, although an HARQ retransmission request is triggered by the NACK indicator at the MAC layer, the retransmission request may be canceled before it is sent to the physical layer. The canceling procedure performed by the UE 302 may be similar to the UE procedure of handling a collision between a measurement gap and a non-adaptive retransmission. In general, a UE may be configured with measurement gaps which can allow the UE to tune its radio away from the serving eNB's operating frequency. As such, the UE can make inter-frequency and/or inter-radio access technology (RAT) measurements. In a 3GPP LTE system, a measurement gap may be 6 ms long on the downlink and 7 ms long on the uplink. During the measurement gaps, the UE may not receive from nor transmit to its serving eNB. In normal uplink HARQ operation, UL-SCH transmission of an uplink HARQ process may be canceled at a corresponding transmission opportunity when the transmission opportunity collides (or overlaps) with a measurement gap.

At subframe n+8 310, since the HARQ retransmission is canceled, the UE 302 can transmit a control-information-only PUSCH transmission 318 without the collision. The HARQ_FEEDBACK value of the uplink HARQ process is still NACK at subframe n+8 310. Since no UL-SCH retransmission is performed at this transmission opportunity, the CURRENT_IRV value is Y mod 4, and the CURRENT_TX_NB value is X+1.

Figure 4:
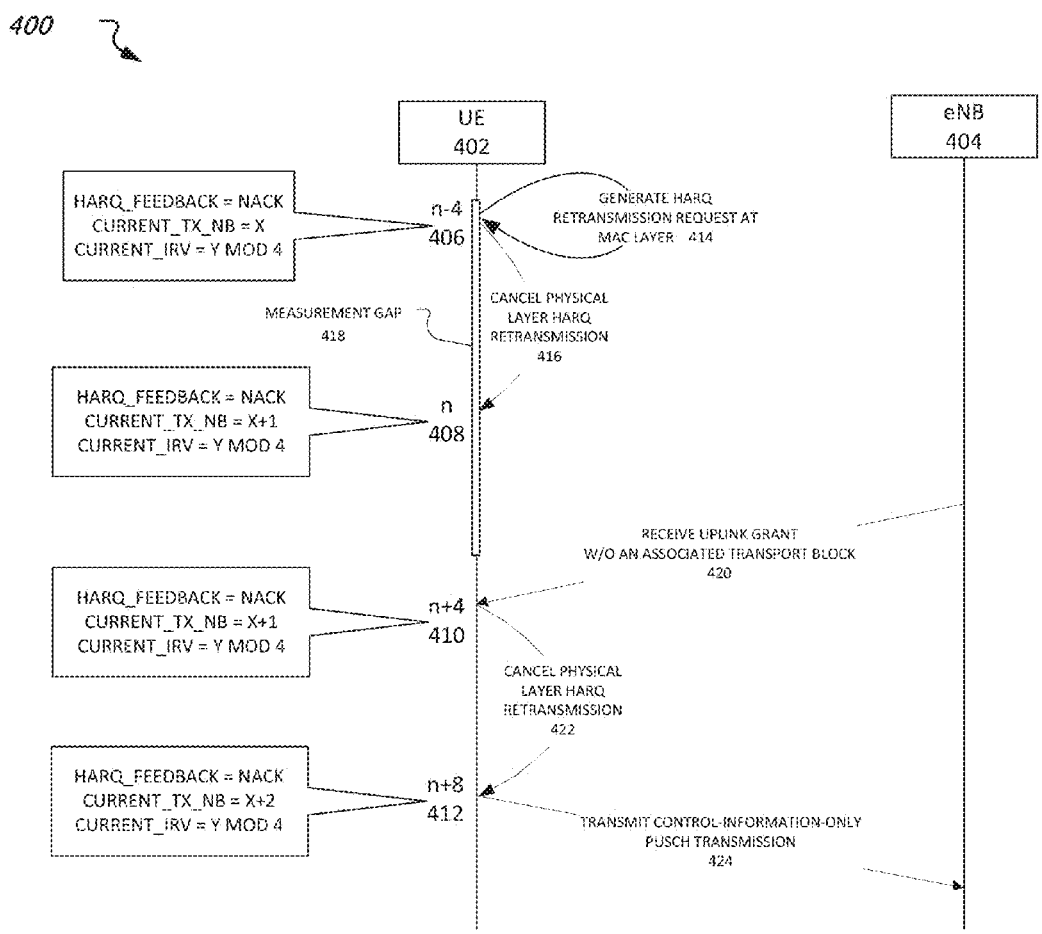
FIG. 4 is a swim lane diagram showing an example collision handling process of colliding PUSCH transmissions and a measurement gap.

FIG. 4 is a swim lane diagram showing an example collision handling process 400 of colliding PUSCH transmissions and a measurement gap. The PUSCH transmissions are associated with an uplink HARQ process of a UE 402. The example collision handling process 400 is performed by the UE 402 to an eNB 404. The example collision handling process 400 may be executed in an FDD LTE system. It will be understood that similar collision handling processes may also be executed in a TDD LTE system.

At subframe n−4 406, the value of HARQ_FEEDBACK associated with the uplink HARQ process is NACK. Therefore, a request is generated at the MAC layer 414 for a non-adaptive HARQ retransmission at the next PUSCH transmission opportunity (i.e., subframe n 408). The state variable CURRENT_TX_NB has a value of X, which corresponds to the number of transmission opportunities counted for the uplink HARQ process. The state variable CURRENT_IRV has a value of Y mod 4, where Y is the number of actual (re)transmissions of the current transport block of the uplink HARQ process that have been performed by the UE 402.

As shown in FIG. 4, subframe n 408 overlaps with a measurement gap 418. Therefore, the MAC layer cancels the physical layer HARQ retransmission 416 before the HARQ retransmission request is sent to the physical layer. At subframe n 408, the HARQ_FEEDBACK value is still NACK, and the CURRENT_IRV value is still Y mod 4. The value of CURRENT_TX_NB increases to X+1 since subframe n 408 is a transmission opportunity of the uplink HARQ process.

At subframe n+4 410, the UE receives an uplink grant without an associated transport block 420 from the eNB 404. Since no HARQ (re)transmission associated with the uplink HARQ process is made at subframe n 408, the PHICH is not checked by the UE for HARQ feedback from the eNB 404. Therefore, the HARQ_FEEDBACK value is still NACK, and a request for HARQ transmission may be generated by the MAC layer for a non-adaptive HARQ retransmission at the next transmission opportunity (i.e., subframe n+8 412). The CURRENT_TX_NB value is still X+1 and the CURRENT_IRV value is Y mod 4, since subframe n+4 410 is not an HARQ transmission opportunity of the uplink HARQ process. As described with regard to FIG. 3, since the received uplink grant without an associated transport block may trigger a control-information-only PUSCH transmission at subframe n+8 412, a collision may occur at subframe n+8 412.

In order to resolve the collision, the UE 402 may cancel the physical layer HARQ retransmission 422 similar to operation 316 described with regard to FIG. 3. At subframe n+8 412, since the HARQ retransmission is canceled, the UE 402 can transmit a control-information-only PUSCH transmission 424 without the collision. The HARQ_FEEDBACK value of the uplink HARQ process is still NACK at subframe n+8 412. Since no UL-SCH retransmission is performed at this transmission opportunity, the CURRENT_IRV value is Y mod 4, and the CURRENT_TX_NB value is X+1.

The collision handling processes 300, 400 described with regard to FIG. 3 and FIG. 4 can handle the situation when TTI bundling is configured by allowing the control-information-only uplink transmission to "puncture" one of the four transmissions that belongs to a TTI bundle. A TTI bundle is a set of four non-adaptive (re)transmissions of the same transport block performed over four consecutive uplink subframes, with one non-adaptive (re)transmission per subframe. By allowing the control-information-only uplink transmission to "puncture" one of these four (re)transmissions, the punctured (re)transmission may not be made in the corresponding subframe, while the control-information-only uplink transmission may be made in the corresponding subframe. The collision handling processes 300, 400 can be enabled based on applying changes to the text in Section 5.4.2.2 of 3GPP technical specification 36.321 as shown in FIG. 5.

FIG. 5 is a schematic showing a 3GPP standard amendment proposal 500. As shown in FIG. 5, the following clause " . . . and there is not an uplink grant without an associated transport block at the time of the transmission" 510 is newly added after the current standard clause "if there is no measurement gap at the time of the transmission and, in case of retransmission, the retransmission does not collide with a transmission for a MAC PDU obtained from the Msg3 buffer in this TTI". This addition to the standard may suggest that if there is no measurement gap at the time of a retransmission (e.g., no measurement gap that overlaps with the transmission opportunity at subframe n+8 with respect to FIGS. 3 and 4), the HARQ retransmission may be generated when no uplink grant without an associated transport block is received. Otherwise, the retransmission may not be generated. The cancelation of the retransmission generation may be based on the collision handling processes described with regard to FIG. 3 and FIG. 4.

Figure 6:
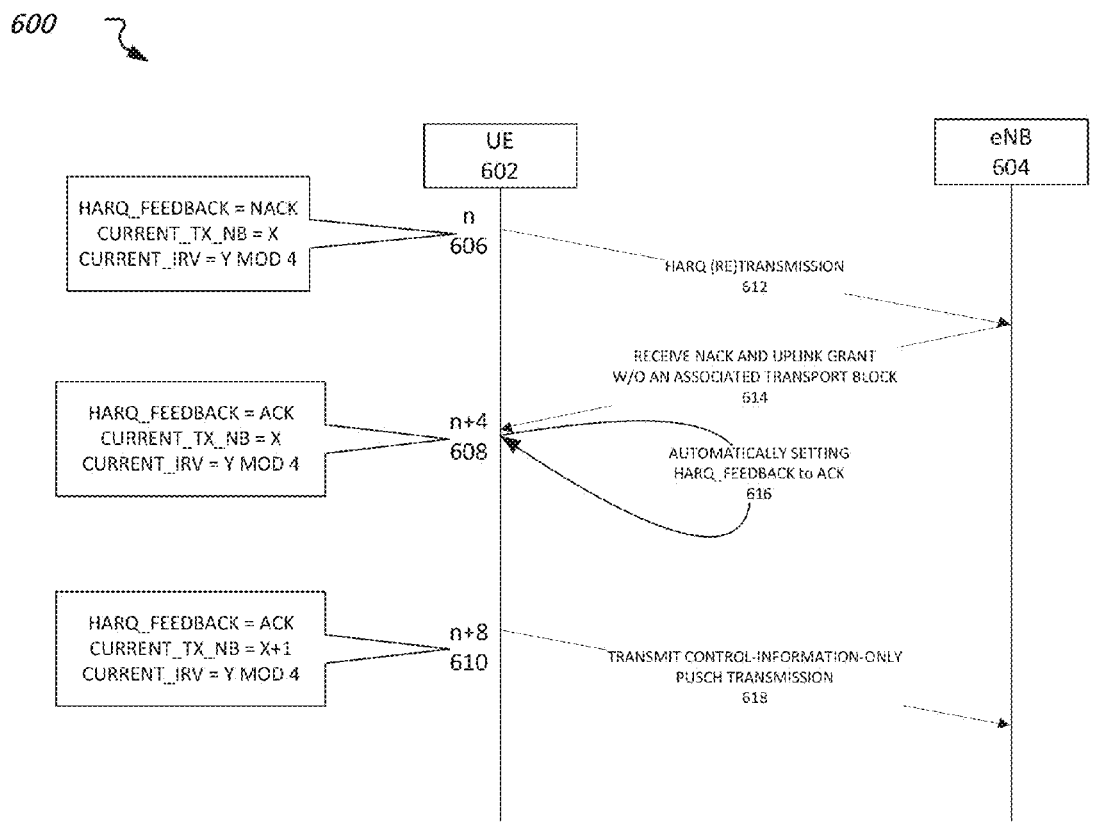
FIG. 6 is a swim lane diagram showing another example collision handling process of colliding PUSCH transmissions.

FIG. 6 is a swim lane diagram showing another example collision handling process 600 of colliding PUSCH transmissions. The example collision handling process 600 is performed by the UE 602 to an eNB 604. The PUSCH transmissions are associated with an uplink HARQ process of the UE 602. The collision handling process 600 may be executed in an FDD LTE system. It will be understood that similar collision handling processes may also be executed in a TDD LTE system.

In the example collision handling process 600 shown in FIG. 6, an HARQ (re)transmission 612 is made by the UE 602 at subframe n 606. The HARQ_FEEDBACK value associated with the uplink HARQ process is set to NACK. The CURRENT_TX_NB is set to an integer X, which corresponds to the number of transmission opportunities counted for the uplink HARQ process including the transmission opportunity at subframe n 606. CURRENT_IRV is set to Y mod 4, where Y is the number of actual transmissions of the current transport block of the uplink HARQ process that have been performed by the UE 602.

At subframe n+4 608, the UE 602 receives a NACK indicator and an uplink grant without an associated transport block 614. The NACK indicator may be received based on decoding control information carried on the physical HARQ indicator channel (PHICH). The NACK indicator may be transmitted by the eNB 604 to indicate that a non-adaptive retransmission is requested at the next corresponding transmission opportunity (i.e., subframe n+8 610). Since the received uplink grant without an associated transport block may trigger a control-information-only PUSCH transmission at subframe n+8 610, a collision may occur at subframe n+8 610.

In order to resolve the collision, the UE 602 may automatically set the state variable HARQ_FEEDBACK value for the UL HARQ process to ACK 616 when the UE receives both NACK and an uplink grant without an associated transport block. The automatic setting operation may be performed in the MAC layer or in the PHY layer by sending ACK indicator to an MAC entity. As such, the MAC layer may not trigger an HARQ retransmission request of the uplink HARQ process. Therefore, although a non-adaptive retransmission request for subframe n+8 610 may be indicated based on the NACK indicator at subframe n+4 608, the non-adaptive retransmission request may not actually be generated due to HARQ_FEEDBACK being equal to ACK. At subframe n+8 610, the UE 602 may transmit a control-information-only PUSCH transmission 618 without the collision.

Generally, automatically setting the HARQ_FEEDBACK value to ACK can override a NACK that may be received on the PHICH due to a previous uplink HARQ (re)transmission. Automatically setting the HARQ_FEEDBACK value to ACK can also ensure proper operation in the event of a previous uplink HARQ transmission being canceled due to a collision with a measurement gap. In some cases, the ACK may be sent to the HARQ entity (e.g., the UE) regardless of whether an UL-SCH transport block is transmitted on the PUSCH during the preceding associated PUSCH subframe. This can ensure that a non-adaptive retransmission request is not generated when there is a possibility that the UL-SCH transport block may collide with a control-information-only uplink transmission. The operation of automatically setting the HARQ_FEEDBACK value to ACK may also be performed to handle the case of TTI bundling by canceling the non-adaptive retransmission of the bundle in case of a potential collision.

At subframe n+4 608, the CURRENT_TX_NB value is still X and the CURRENT_IRV value is still Y mode 4, since subframe n+4 608 is not a transmission opportunity of the uplink HARQ process. At subframe n+8 610, the HARQ_FEEDBACK value of the uplink HARQ process may remain to be set to ACK. When the eNB 604 determines to request (re)transmissions of the current transport block of the uplink HARQ process, the eNB 604 can order an adaptive retransmission from the UE 602. Since no UL-SCH retransmission is performed at this transmission opportunity, the CURRENT_IRV value is Y mod 4, and the CURRENT_TX_NB value is X+1.

Figure 7:
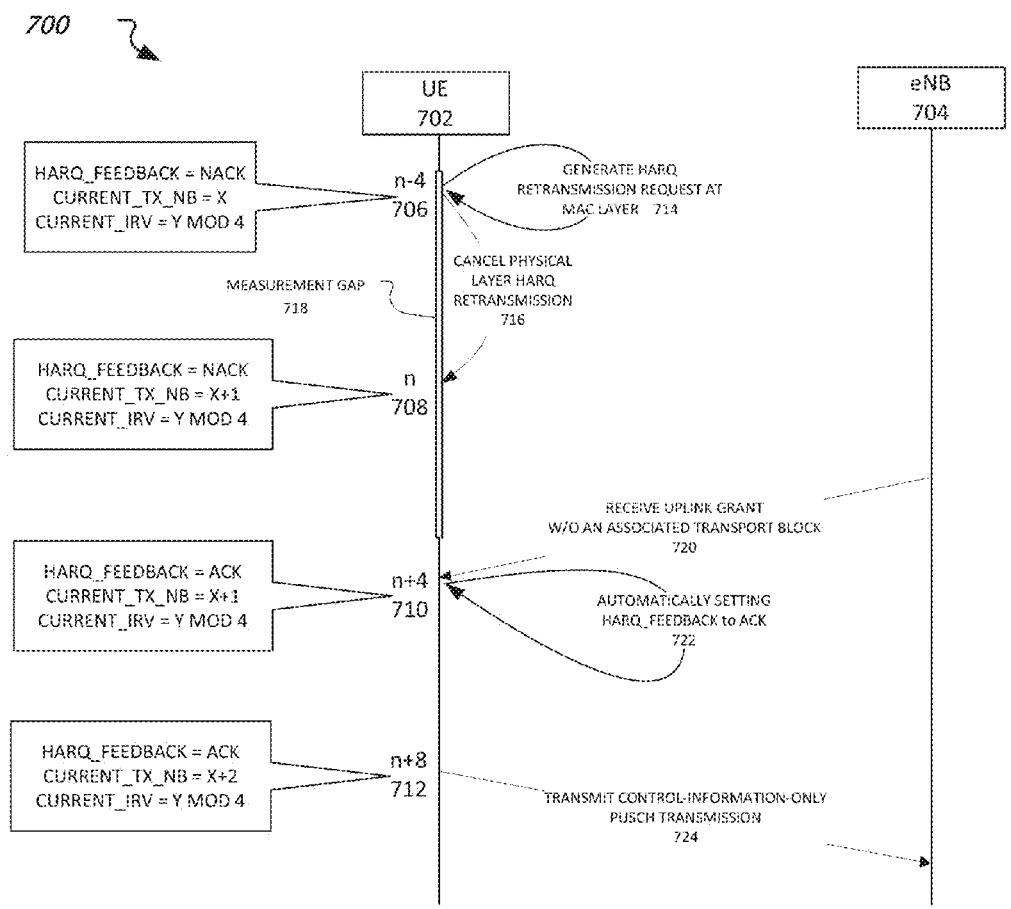
FIG. 7 is a swim lane diagram showing another example collision handling process of colliding PUSCH transmissions and a measurement gap.

FIG. 7 is a swim lane diagram showing another example collision handling process 700 of colliding PUSCH transmissions and a measurement gap. The PUSCH transmissions are associated with an uplink HARQ process of a UE 702. The example collision handling process 700 is performed by the UE 702 to an eNB 704. The example collision handling process 700 may be executed in an FDD LTE system. It will be understood that similar collision handling processes may also be executed in a TDD LTE system.

At subframe n−4 706, the value of HARQ_FEEDBACK associated with the uplink HARQ process is NACK. Therefore, a request is generated at the MAC layer 714 for an HARQ retransmission at the next PUSCH transmission opportunity (i.e., subframe n 708). The state variable CURRENT_TX_NB has a value of X, which corresponds to the number of transmission opportunities counted for the uplink HARQ process. The state variable CURRENT_IRV has a value of Y mod 4, where Y is the number of actual transmissions of the current transport block of the uplink HARQ process that have been performed by the UE 702.

As shown in FIG. 7, subframe n 708 overlaps with a measurement gap 718. Therefore, the MAC cancels the physical layer HARQ retransmission 716 before the HARQ retransmission request is sent to the physical layer. At subframe n 708, the HARQ_FEEDBACK value is still NACK, and the CURRENT_IRV value is still Y mod 4. The value of CURRENT_TX_NB increases to X+1 since subframe n 708 is a transmission opportunity of the uplink HARQ process.

At subframe n+4 710, the UE receives an uplink grant without an associated transport block 720 from the eNB 704. Since no HARQ transmission associated with the uplink HARQ process is made at subframe n 708, the PHICH is not checked by the UE for HARQ feedback from the eNB 704. Therefore, the HARQ_FEEDBACK value is still NACK, and a request for HARQ transmission may be generated by the MAC layer for an HARQ retransmission at the next transmission opportunity (i.e., subframe n+8 712). The CURRENT_TX_NB value is still X+1 and the CURRENT_IRV value is Y mod 4, since subframe n+4 710 is not an HARQ transmission opportunity of the uplink HARQ process. Since the received uplink grant without an associated transport block may trigger a control-information-only PUSCH transmission at subframe n+8 712, a collision may occur at subframe n+8 712.

In order to resolve the collision, the UE 702 may automatically set the state variable HARQ_FEEDBACK value for that UL HARQ process to ACK 722. As such, the MAC layer may not trigger an HARQ retransmission request of the uplink HARQ process. Therefore, although a non-adaptive retransmission request for subframe n+8 712 may be indicated based on the NACK indicator from subframes n−4 706 and n 708, the non-adaptive retransmission request may not actually be generated due to HARQ_FEEDBACK being equal to ACK. At subframe n+4 710, the CURRENT_TX_NB value is still X and the CURRENT_IRV value is still Y mode 4, since subframe n+4 710 is not a transmission opportunity of the uplink HARQ process. At subframe n+8 712, the HARQ_FEEDBACK value of the uplink HARQ process may remain to be set to ACK. When the eNB 704 determines to request (re)transmissions of the current transport block of the uplink HARQ process, the eNB 704 can order an adaptive retransmission from the UE 702. Since no UL-SCH retransmission is performed at this transmission opportunity, the CURRENT_IRV value is Y mod 4, and the CURRENT_TX_NB value is X+1.

The collision handling processes 600, 700 described with regard to FIG. 6 and FIG. 7 can be enabled based on applying changes to the text in Section 8.3 of 3GPP technical specification 36.213 as shown in FIG. 8. FIG. 8 is a schematic showing another 3GPP standard amendment proposal 800. As shown in FIG. 8, the following clause "[i]f there is an uplink grant without an associated transport block (as defined in Section 8.6.2) for the subsequent associated PUSCH subframe (as defined in Section 8), then ACK shall be delivered to the higher layers regardless of whether or not a transport block was actually transmitted in the preceding associated PUSCH subframe. Otherwise . . . " 810 is newly added after the current standard clause "[t]he physical layer in the UE shall deliver indications to the higher layers as follows". This addition to the standard may suggest that when an uplink grant without an associated transport block is received, an ACK indicator may be delivered to the MAC layer. As described with regard to FIG. 6 and FIG. 7, the request for transmitting the HARQ retransmission may not be generated by the MAC layer. Accordingly, the HARQ retransmission may not collide with the control-only-information PUSCH transmission triggered by the received uplink grant.

Figure 9:
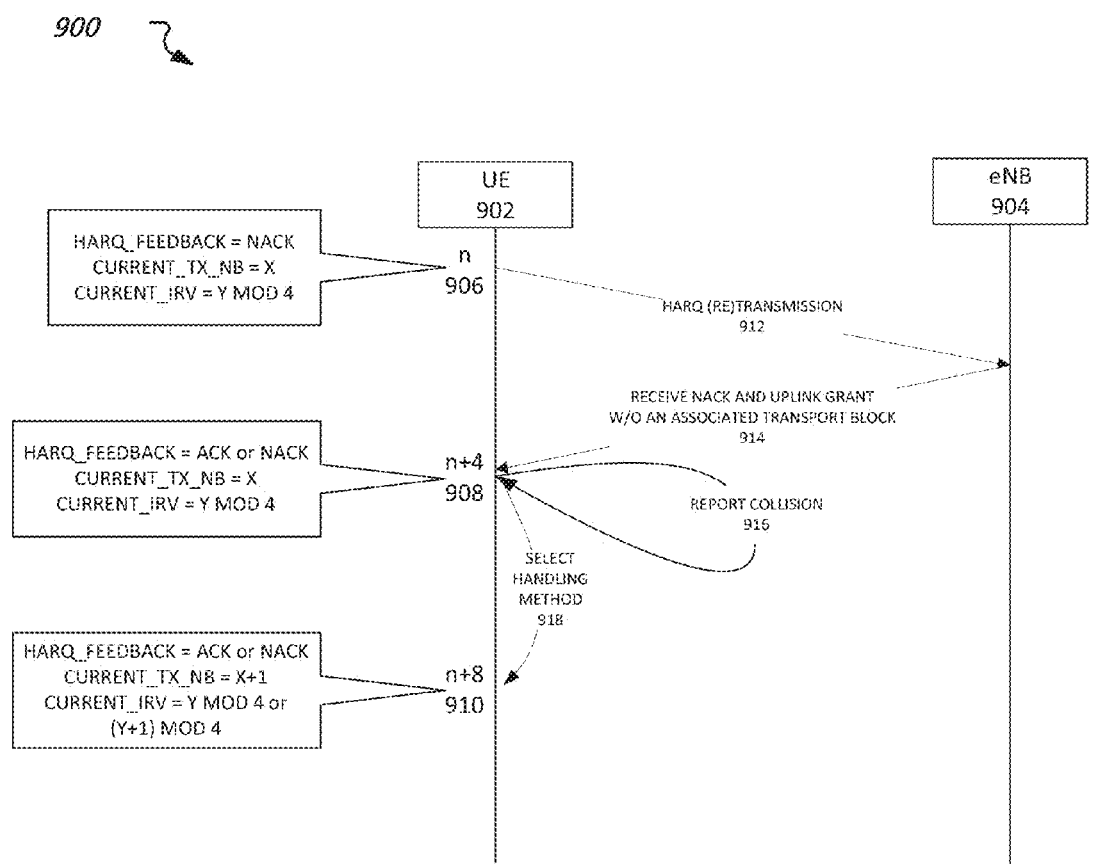
FIG. 9 is a swim lane diagram showing another example collision handling process of colliding PUSCH transmissions.

FIG. 9 is a swim lane diagram showing another example collision handling process 900 of colliding PUSCH transmissions. The example collision handling process 900 is performed by a UE 902 to an eNB 904. The PUSCH transmissions are associated with an uplink HARQ process of the UE 902. The collision handling process 900 may be executed in an FDD LTE system. It will be understood that similar collision handling processes may also be executed in a TDD LTE system.

In the example collision handling process 900 shown in FIG. 9, an HARQ (re)transmission 912 is made by the UE 902 at subframe n 906. The HARQ_FEEDBACK value associated with the uplink HARQ process is set to NACK, the CURRENT_TX_NB value is X, which corresponds to the number of transmission opportunities counted for the uplink HARQ process. The CURRENT_IRV value is Y mod 4, where Y is the number of actual transmissions of the current transport block of the uplink HARQ process that have been performed by the UE 902. At subframe n+4 908, the UE 902 receives a NACK indicator and an uplink grant without an associated transport block 914. The NACK indicator may be received based on decoding control information carried on the physical HARQ indicator channel (PHICH). The NACK indicator may be transmitted by the eNB 904 to indicate that a non-adaptive retransmission is requested. The NACK indicator can cause the MAC layer to request a non-adaptive retransmission at the next corresponding transmission opportunity (i.e., subframe n+8 910). Since the received uplink grant without an associated transport block can trigger a control-information-only PUSCH transmission at subframe n+8 910, a collision may occur at subframe n+8 910.

In order to resolve the collision, the MAC layer may define the collision as an error situation. The UE 902 may be allowed to choose the handling method 918 of the error situation based on specific UE 902 implementations. For example, the UE 902 may choose to disregard the received uplink grant without a transport block and perform an HARQ retransmission of the uplink HARQ process at subframe n+8 910. The UE 902 may alternatively choose to perform the control-information-only PUSCH transmission at subframe n+8 910 based on one of the collision handling processes described with regard to FIGS. 3 and 6. In some cases, the UE 902 may also choose to disregard both the HARQ retransmission request and the received uplink grant, and perform neither an HARQ retransmission nor the control-information-only transmission at subframe n+8 910.

At subframe n+4 908, when the UE 902 chooses to perform the control-information-only PUSCH transmission at subframe n+8 910 by automatically setting the NACK to ACK, as described with regard to FIG. 6, the HARQ_FEEDBACK value is set to ACK. Otherwise, the HARQ_FEEDBACK value is still NACK. Since subframe n+4 908 is not a transmission opportunity of the uplink HARQ process, the CURRENT_TX_NB value is still X, the CURRENT_IRV value is still Y MOD 4. At subframe n+8 910, when the control-information-only PUSCH transmission is performed based on automatically setting the NACK to ACK at n+4 908, as described with regard to FIG. 6, the HARQ_FEEDBACK value remains to be set to ACK. Otherwise, the HARQ_FEEDBACK value is NACK. The CURRENT_TX_NB is X+1, since subframe n+8 910 is a transmission opportunity. When the UE 902 chooses to perform an HARQ retransmission of the uplink HARQ process at subframe n+8 910, the CURRENT_IRV value changes to (Y+1) MOD 4. Otherwise, the CURRENT_IRV value is still Y MOD 4.

Figure 10:
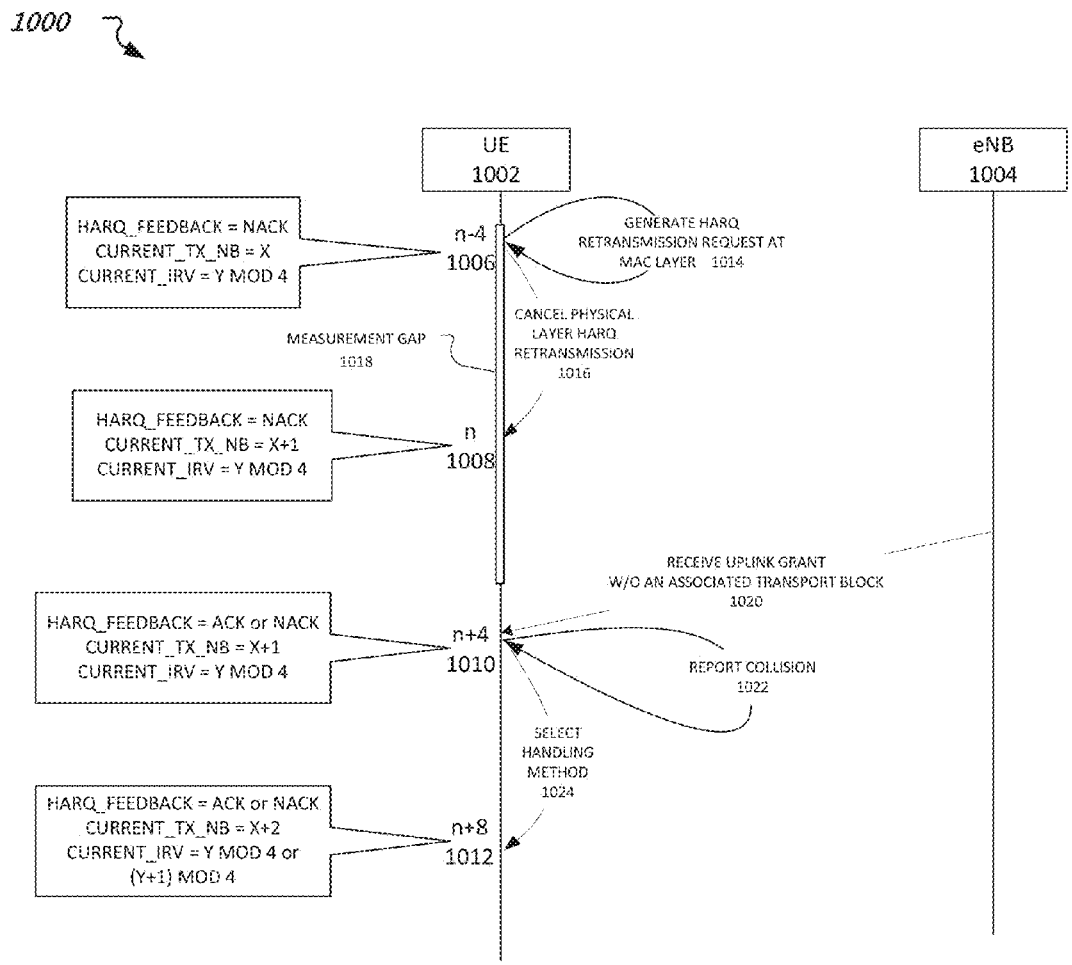
FIG. 10 is a swim lane diagram showing another example collision handling process of colliding PUSCH transmissions and a measurement gap.

FIG. 10 is a swim lane diagram showing another example collision handling process 1000 of colliding PUSCH transmissions and a measurement gap. The PUSCH transmissions are associated with an uplink HARQ process of a UE 1002. The example collision handling process 1000 is performed by the UE 1002 to an eNB 1004. The example collision handling process 1000 may be executed in an FDD LTE system. It will be understood that similar collision handling processes may also be executed in a TDD LTE system.

At subframe n−4 1006, the value of HARQ_FEEDBACK associated with the uplink HARQ process is NACK. Therefore, a request is generated at the MAC layer 1014 for an HARQ retransmission at the next PUSCH transmission opportunity (i.e., subframe n 1008). As shown in FIG. 10, subframe n 1008 overlaps with a measurement gap 1018. Therefore, the MAC cancels the physical layer HARQ retransmission 1016 before the HARQ retransmission request is sent to the physical layer.

At subframe n−4 1006, the CURRENT_TX_NB value is X, which corresponds to the number of transmission opportunities counted for the uplink HARQ process. The CURRENT_IRV value is Y mod 4, where Y is the number of actual transmissions of the current transport block of the uplink HARQ process that have been performed by the UE 1002. At subframe n 1008, the CURRENT_TX_NB value is X+1, since subframe n 1008 is a transmission opportunity of the uplink HARQ process. The HARQ_FEEDBACK value is still NACK, and the CURRENT_IRV value is still Y MOD 4, due to the measurement gap 1018.

At subframe n+4 1010, the UE receives an uplink grant without an associated transport block 1020 from the eNB 1004. Since no HARQ transmission associated with the uplink HARQ process is made at subframe n 1008, the PHICH is not checked by the UE for HARQ feedback from the eNB 1004. Therefore, the HARQ_FEEDBACK value is still NACK, and a request for HARQ transmission may be generated by the MAC layer for a non-adaptive HARQ retransmission at the next transmission opportunity (i.e., subframe n+8 1012). Since the received uplink grant without an associated transport block may trigger a control-information-only PUSCH transmission at subframe n+8 1012, a collision may occur at subframe n+8 1012. In order to resolve the collision, the MAC layer may define the collision as an error situation. The UE 1002 may be allowed to choose the handling method 1024 of the error situation based on specific UE 1002 implementations. For example, the UE 1002 may choose to disregard the received uplink grant without a transport block and perform a non-adaptive HARQ retransmission of the uplink HARQ process at subframe n+8 1012. The UE 1002 may alternatively choose to perform the control-information-only PUSCH transmission at subframe n+8 1012 based on one of the collision handling processes described with regard to FIGS. 4 and 7. In some cases, the UE 1002 may also choose to disregard both the HARQ retransmission request and the received uplink grant, and perform neither an HARQ retransmission nor the control-information-only transmission at subframe n+8 1012.

At subframe n+4 1010, when the UE 1002 chooses to perform the control-information-only PUSCH transmission at subframe n+8 1012 by automatically setting the NACK to ACK, as described with regard to FIG. 7, the HARQ_FEEDBACK value is set to ACK. Otherwise, the HARQ_FEEDBACK value is still NACK. Since subframe n+4 1010 is not a transmission opportunity of the uplink HARQ process, the CURRENT_TX_NB value is still X+1, the CURRENT_IRV value is still Y MOD 4. At subframe n+8 1012, when the control-information-only PUSCH transmission is performed based on automatically setting the NACK to ACK at n+4 1010, as described with regard to FIG. 7, the HARQ_FEEDBACK value remains to be set to ACK. Otherwise, the HARQ_FEEDBACK value is NACK. The CURRENT_TX_NB is X+2, since subframe n+8 1012 is a transmission opportunity. When the UE 1002 chooses to perform an HARQ retransmission of the uplink HARQ process at subframe n+8 1012, the CURRENT_IRV value changes to (Y+1) MOD 4. Otherwise, the CURRENT_IRV value is still Y MOD 4.

The collision handling processes 900, 1000 described with regard to FIG. 9 and FIG. 10 can be enabled based on applying changes to the text in Section 5.4.2.2 of 3GPP technical specification 36.321 as shown in FIG. 11. FIG. 11 is a schematic showing another 3GPP standard amendment proposal 1100. As shown in FIG. 11, the following clarification note 1110 is added: "NOTE: When a triggered non-adaptive retransmission and an uplink grant without an associated transport block (Section 8.6.2 of [36.213]) occur in the same TTI, the UE may choose which, if any, transmission to proceed with." This addition to the 3GPP standard may suggest that in case a collision may occur based on both a non-adaptive retransmission and a control-information-only PUSCH transmission are triggered at the same subframe, the UE may choose which transmission to perform, if any transmission is performed at all. The UE may choose how to handle the collision either "statically" or "dynamically". When how to handle the collision is statically chosen, the operation the UE performs is predetermined. The predetermined operation can be automatically triggered when the error situation is triggered. When how to handle the collision is dynamically chosen, the UE can choose one of the collision handling operations after receiving indication from MAC layer that a collision may occur.

Figure 12:
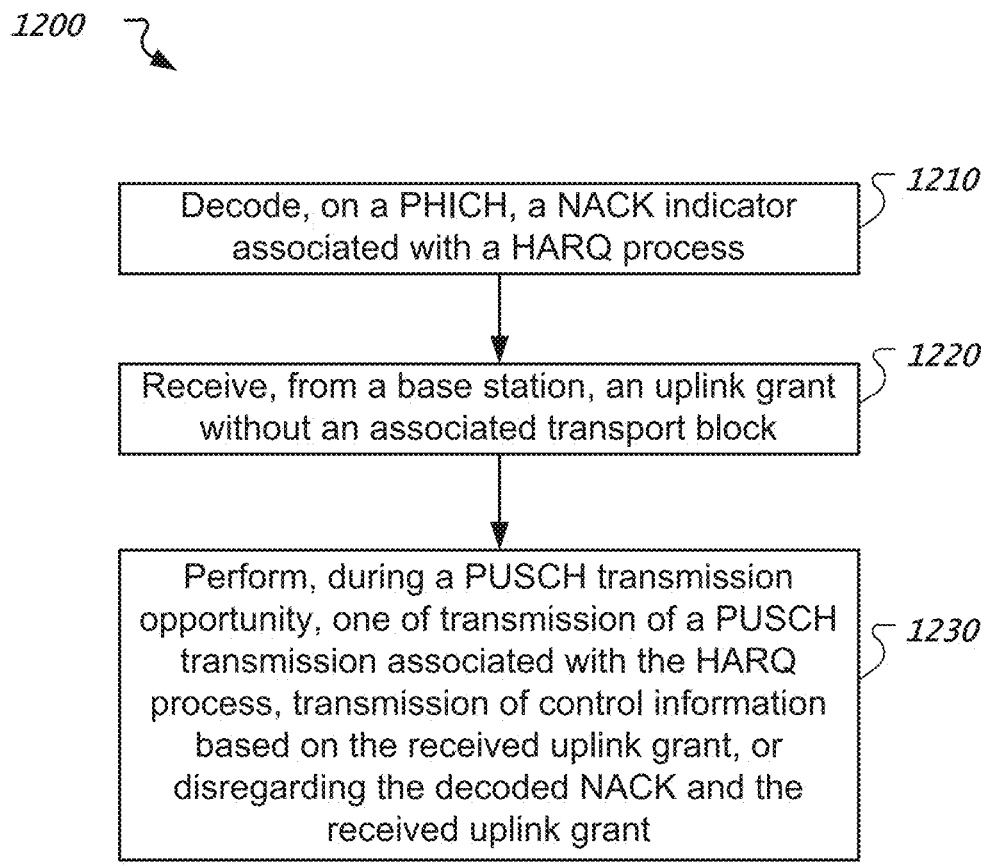
FIG. 12 is a flowchart showing an example HARQ process including a collision handling process.

FIG. 12 is a flowchart showing an example HARQ process 1200. The HARQ process may be performed by a UE. At 1210, the UE decodes, on a PHICH, a NACK indicator associated with the HARQ process. In some implementations, the NACK indicator may be transmitted by a base station (e.g., an eNB) in response to an HARQ (re)transmission at a preceding transmission opportunity of the HARQ process. The preceding transmission opportunity of the HARQ process may not overlap with a measurement gap. In other words, a PUSCH transmission associated with the HARQ process is transmitted by the UE at the preceding transmission opportunity. The NACK indicator may be transmitted on a PHICH. The NACK indicator can trigger a non-adaptive HARQ retransmission at the succeeding PUSCH transmission opportunity of the HARQ process. As described with regard to FIG. 3, the HARQ retransmission may include information associated with a UL-SCH transport block (or equivalently, a UL-SCH MAC PDU). The HARQ retransmission is a PUSCH transmission associated with the HARQ process.

At 1220, the UE receives, from the base station, an uplink grant without an associated transport block. The received uplink grant may correspond to a control-information-only PUSCH transmission at the succeeding transmission opportunity of the HARQ process. As described with regard to FIG. 3, the uplink grant without an associated transport block may be sufficiently small that a UL-SCH transport block may not be included in the corresponding PUSCH transmission. Instead, a control-information-only PUSCH transmission is triggered to be transmitted at the succeeding transmission opportunity of the HARQ process. Therefore, there may be a scheduling collision at the corresponding PUSCH transmission opportunity of the HARQ process based on the decoded NACK indicator and the received uplink grant without an associated transport block.

At 1230, the UE performs, during the PUSCH transmission opportunity, one of transmission of a PUSCH transmission associated with the HARQ process, transmission of control information based on the received uplink grant, or disregarding the decoded NACK and the received uplink grant. When both the NACK indicator and the uplink grant without a transport block are obtained by the UE, an error situation may be triggered. The UE can choose how to handle the error situation. In some implementations, the UE can choose how to handle the error situation "statically". That is, the operation the UE performs when the error situation occurs is predetermined. The predetermined operation can be automatically triggered when the error situation is triggered. For example, the predetermined operation may include one of transmission of a HARQ retransmission, transmission of control information based on the received uplink grant without an associated transport block, or disregarding the decoded NACK and the received uplink grant. In some implementations, the UE can choose how to handle the error situation "dynamically". For example, the UE may be notified when the error situation is triggered. The UE can dynamically choose to either transmit the HARQ retransmission, or the control information based on the received uplink grant without an associated transport block. Alternatively, the UE can disregard the NACK and the received uplink grant, and perform neither the HARQ retransmission nor the control information.

In some implementations, the UE can handle the collision based on the collision handling process as described with regard to FIG. 3. For example, the UE can cancel a request for the PUSCH transmission associated with the HARQ process based on receiving the uplink grant without an associated transport block, and transmit the control information at the PUSCH transmission opportunity. In some implementations, the UE can handle the collision based on the collision handling process as described with regard to FIG. 6. For example, the UE can automatically set a state variable HARQ_FEEDBACK associated with the HARQ process to an ACK indicator based on receiving the uplink grant without and associated transport block, and transmit the control information at the PUSCH transmission opportunity.

Figure 13:
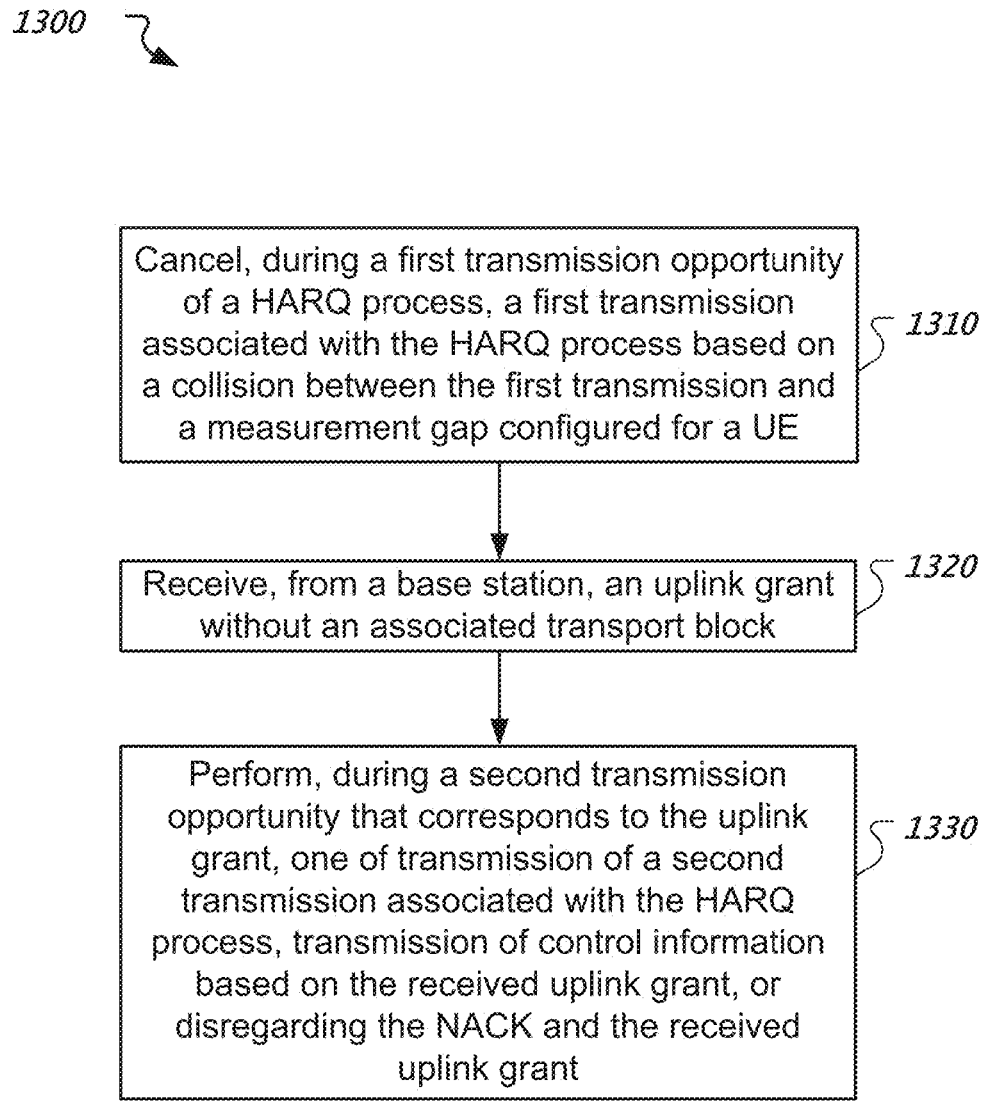
FIG. 13 is a flowchart showing an example HARQ process including a collision handling process and a measurement gap.

FIG. 13 is a flowchart showing an example HARQ process 1300 with a measurement gap. The HARQ process may be performed by a UE. At 1310, the UE cancels, at a first transmission opportunity of an HARQ process, a first transmission associated with the HARQ process based on a collision between the first transmission opportunity and a measurement gap. In the example HARQ process 1300 illustrated in FIG. 13, a measurement gap overlaps with the first transmission opportunity. As described with regard to FIG. 4, in such case, the HARQ transmission is not transmitted due to the measurement gap. Since the HARQ transmission at the first transmission opportunity is not performed, the UE may not decode on the PHICH for the HARQ feedback. The HARQ_FEEDBACK state variable of the UE has a NACK value at the first transmission opportunity, such that a non-adaptive HARQ retransmission is prepared by the UE to be transmitted at a second transmission opportunity associated with the HARQ process. The second transmission opportunity may be a succeeding transmission opportunity of the first transmission opportunity. As described with regard to FIG. 3, the HARQ retransmission may include information associated with a UL-SCH transport block (or equivalently, a UL-SCH MAC PDU). The HARQ retransmission is a PUSCH transmission associated with the HARQ process.

At 1320, the UE receives, from a base station (e.g., an eNB), an uplink grant without an associated transport block. The received uplink grant may correspond to a control-information-only PUSCH transmission at the second transmission opportunity. As described with regard to FIG. 3, the uplink grant without an associated transport block may be sufficiently small that a UL-SCH transport block may not be included in the corresponding PUSCH transmission. Instead, a control-information-only PUSCH transmission is triggered to be transmitted at the second transmission opportunity. Therefore, there may be a scheduling collision at the second transmission opportunity triggered by the NACK value of the HARQ_FEEDBACK variable and the received uplink grant without an associated transport block.

At 1330, the UE selects to transmit, at the PUSCH transmission opportunity, a PUSCH transmission associated with the HARQ process, or to transmit control information based on the received uplink grant, or to disregard the NACK and the received uplink grant. When both the NACK indicator and the uplink grant without a transport block are obtained by the UE, an error situation may be triggered. The UE can choose how to handle the error situation. In some implementations, the UE can choose how to handle the error situation "statically". That is, the operation the UE performs when the error situation occurs is predetermined. The predetermined operation can be automatically triggered when the error situation is triggered. For example, the predetermined operation may include one of transmission of a HARQ retransmission, transmission of control information based on the received uplink grant without an associated transport block, or disregarding the decoded NACK and the received uplink grant. In some implementations, the UE can choose how to handle the error situation "dynamically". For example, the UE may be notified when the error situation is triggered. The UE can dynamically choose to either transmit the HARQ retransmission, or the control information based on the received uplink grant without an associated transport block. Alternatively, the UE can disregard the NACK and the received uplink grant, and perform neither the HARQ retransmission nor the control information.

In some implementations, the UE can handle the collision based on the collision handling process as described with regard to FIG. 4. For example, the UE can cancel a request for the PUSCH transmission associated with the HARQ process based on receiving the uplink grant without an associated transport block, and transmit the control information at the PUSCH transmission opportunity. In some implementations, the UE can handle the collision based on the collision handling process as described with regard to FIG. 7. For example, the UE can automatically set a state variable HARQ_FEEDBACK associated with the HARQ process to an ACK indicator based on receiving the uplink grant without and associated transport block, and transmit the control information at the PUSCH transmission opportunity.

While this document contains many specifics, these should not be construed as limitations on the scope of what may be claimed, but rather as descriptions of features specific to particular implementations. Certain features that are described in this document in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

It should be understood that all the processes disclosed in this disclosure may include additional, fewer, and/or different operations performed in the order shown or in a different order. Moreover, one or more of the individual operations and/or subsets of the operations in the processes can be performed in isolation and/or in different contexts to achieve a similar or different result. In some implementations, one or more of the operations in the processes may be iterated, repeated, omitted, modified, and/or performed by multiple sub-operations. Some or all aspects of the processes may be implemented by data processing apparatus executing computer-readable instructions, which may be included in one or more software programs, modules, or applications configured to provide the functionality described.

Only a few examples and implementations are disclosed. Variations, modifications, and enhancements to the described examples and implementations and other implementations can be made based on what is disclosed.

What is claimed is:

1. A method performed by a user equipment (UE), comprising:
   decoding, on a physical hybrid automatic repeat request (HARQ) indicator channel, a negative acknowledgement (NACK) indicator associated with an HARQ process, wherein receipt of the NACK indicator triggering a first transmission in a physical uplink shared channel (PUSCH) transmission opportunity;
   receiving, from a base station, an uplink grant without an associated transport block, wherein receipt of the uplink grant triggers a second transmission in the PUSCH transmission opportunity; and
   in response to receipt of the NACK indicator and receipt of the uplink grant, performing, during the PUSCH transmission opportunity, one of transmission of a PUSCH transmission associated with the HARQ process, transmission of control information based on the received uplink grant, or disregarding the decoded NACK and the received uplink grant.

2. The method of claim 1, further comprising:
   canceling a request for the PUSCH transmission associated with the HARQ process based on receiving the uplink grant without an associated transport block; and
   transmitting the control information during the PUSCH transmission opportunity.

3. The method of claim 1, further comprising:
   automatically setting a state variable HARQ_FEEDBACK associated with the HARQ process to a positive acknowledgement (ACK) indicator based on receiving the uplink grant without an associated transport block; and transmitting the control information during the PUSCH transmission opportunity.

4. The method of claim 1, wherein the PUSCH transmission opportunity is a subframe, and the PUSCH transmission includes information associated with an uplink-shared channel media access control protocol data unit (UL-SCH MAC PDU).

5. The method of claim 1, wherein the PUSCH transmission comprises a non-adaptive retransmission of a previous PUSCH transmission associated with the HARQ process.

6. The method of claim 1, wherein the uplink grant is indicated by a downlink control information (DCI) format 0 that includes a modulation and coding scheme (MCS) index that equals 29, a channel state information (CSI) request bit that is set to 1, and a number of allocated physical resource blocks that is less than or equal to four, and wherein the uplink grant is not reported to a MAC layer or an uplink HARQ entity.

7. The method of claim 1, wherein the control information includes a channel state information (CSI) report associated with a downlink channel quality.

8. The method of claim 1, wherein the second transmission opportunity does not collide with a measurement gap configured for the UE.

9. A method performed by a user equipment (UE), comprising:
canceling, during a first transmission opportunity of a hybrid automatic repeat request (HARQ) process, a first transmission associated with the HARQ process based on a collision between the first transmission and a measurement gap configured for the UE, wherein a state variable HARQ_FEEDBACK associated with the HARQ process of the UE has a negative acknowledgement (NACK) value, and the cancellation of the first transmission triggers a second transmission in a second transmission opportunity;
receiving, from a base station, an uplink grant without an associated transport block wherein receipt of the uplink grant triggers a third transmission in the second transmission opportunity; and
in response to cancellation of the first transmission and receipt of the uplink grant, performing, during the second transmission opportunity that corresponds to the uplink grant, one of transmission of a second transmission associated with the HARQ process, transmission of control information based on the received uplink grant, or disregarding the NACK and the received uplink grant.

10. The method of claim 9, further comprising:
canceling a request for the second transmission associated with the HARQ process based on receiving the uplink grant without an associated transport block; and
transmitting the control information during the second transmission opportunity.

11. The method of claim 9, further comprising:
automatically setting the state variable HARQ_FEEDBACK to a positive acknowledgement (ACK) indicator based on receiving the uplink grant without an associated transport block; and
transmitting the control information during the second transmission opportunity.

12. The method of claim 9, wherein the first transmission opportunity comprises a first subframe, the second transmission opportunity comprises a second subframe, and the first transmission and the second transmission each includes information associated with an uplink-shared channel media access control protocol data unit (UL-SCH MAC PDU).

13. The method of claim 9, wherein the second transmission is a non-adaptive retransmission of the first transmission.

14. The method of claim 9, wherein the uplink grant is indicated by a downlink control information (DCI) format 0 that includes a modulation and coding scheme (MCS) index that equals 29, a channel state information (CSI) request bit that is set to 1, and a number of allocated physical resource blocks that is less than or equal to four, and wherein the uplink grant is not reported to a MAC layer or an uplink HARQ entity.

15. The method of claim 9, wherein the control information includes a channel state information (CSI) report associated with a downlink channel quality.

16. A user equipment (UE) comprising a hardware processor operable to perform operations comprising:
decoding, on a physical hybrid automatic repeat request (HARQ) indicator channel, a negative acknowledgement (NACK) indicator associated with an HARQ process, wherein receipt of the NACK indicator triggering a first transmission in a physical uplink shared channel (PUSCH) transmission opportunity;
receiving, from a base station, an uplink grant without an associated transport block wherein receipt of the uplink grant triggers a second transmission in the PUSCH transmission opportunity; and
in response to receipt of the NACK indicator and receipt of the uplink grant, performing, during the PUSCH transmission opportunity, one of transmission of a PUSCH transmission associated with the HARQ process, transmission of control information based on the received uplink grant, or disregarding the decoded NACK and the received uplink grant.

17. The UE of claim 16, the hardware processor further operable to perform operations comprising:
canceling a request for the PUSCH transmission associated with the HARQ process based on receiving the uplink grant without an associated transport block; and
transmitting the control information during the PUSCH transmission opportunity.

18. The UE of claim 16, the hardware processor further operable to perform operations comprising:
automatically setting a state variable HARQ_FEEDBACK associated with the HARQ process to a positive acknowledgement (ACK) indicator based on receiving the uplink grant without an associated transport block; and
transmitting the control information during the PUSCH transmission opportunity.

19. The UE of claim 16, wherein the PUSCH transmission opportunity is a subframe, and the PUSCH transmission includes information associated with an uplink-shared channel media access control protocol data unit (UL-SCH MAC PDU).

20. The UE of claim 16, wherein the PUSCH transmission comprises a non-adaptive retransmission of a previous PUSCH transmission associated with the HARQ process.

21. The UE of claim 16, wherein the uplink grant is indicated by a downlink control information (DCI) format 0 that includes a modulation and coding scheme (MCS) index that equals 29, a channel state information (CSI) request bit that is set to 1, and a number of allocated physical resource blocks that is less than or equal to four, and wherein the uplink grant is not reported to a MAC layer or an uplink HARQ entity.

22. The UE of claim 16, wherein the control information includes a channel state information (CSI) report associated with a downlink channel quality.

23. The UE of claim 16, wherein the second transmission does not collide with a measurement gap configured for the UE.

24. A user equipment (UE) comprising a hardware processor operable to perform operations comprising:
   canceling, during a first transmission opportunity of a hybrid automatic repeat request (HARQ) process, a first transmission associated with the HARQ process based on a collision between the first transmission and a measurement gap configured for the UE, wherein a state variable HARQ_FEEDBACK associated with the HARQ process of the UE has a negative acknowledgement (NACK) value, and the cancellation of the first transmission triggers a second transmission in a second transmission opportunity;
   receiving, from a base station, an uplink grant without an associated transport block wherein receipt of the uplink grant triggers a third transmission in the second transmission opportunity; and
   in response to cancellation of the first transmission and receipt of the uplink grant, performing, during the second transmission opportunity that corresponds to the uplink grant, one of transmission of a second transmission associated with the HARQ process, transmission of control information based on the received uplink grant, or disregarding the NACK and the received uplink grant.

25. The UE of claim 24, the hardware processor further operable to perform operations comprising:
   canceling a request for the second transmission associated with the HARQ process based on receiving the uplink grant without an associated transport block; and
   transmitting the control information during the second transmission opportunity.

26. The UE of claim 24, the hardware processor further operable to perform operations comprising:
   automatically setting the state variable HARQ_FEEDBACK to a positive acknowledgement (ACK) indicator based on receiving the uplink grant without an associated transport block; and
   transmitting the control information during the second transmission opportunity.

27. The UE of claim 24, wherein the first transmission opportunity comprises a first subframe, the second transmission opportunity comprises a second subframe, and the first transmission and the second transmission each includes information associated with an uplink-shared channel media access control protocol data unit (UL-SCH MAC PDU).

28. The UE of claim 24, wherein the second transmission is a non-adaptive retransmission of the first transmission.

29. The UE of claim 24, wherein the uplink grant is indicated by a downlink control information (DCI) format 0 that includes a modulation and coding scheme (MCS) index that equals 29, a channel state information (CSI) request bit that is set to 1, and a number of allocated physical resource blocks that is less than or equal to four, and wherein the uplink grant is not reported to a MAC layer or an uplink HARQ entity.

30. The UE of claim 24, wherein the control information includes a channel state information (CSI) report associated with a downlink channel quality.

31. A non-transitory computer-readable medium storing instructions which cause a processor of a user equipment (UE) to perform operations comprising:
   decoding, on a physical hybrid automatic repeat request (HARQ) indicator channel, a negative acknowledgement (NACK) indicator associated with an HARQ process, wherein receipt of the NACK indicator triggering a first transmission in a physical uplink shared channel (PUSCH) transmission opportunity;
   receiving, from a base station, an uplink grant without an associated transport block, wherein receipt of the uplink grant triggers a second transmission in the PUSCH transmission opportunity; and
   in response to receipt of the NACK indicator and receipt of the uplink grant, performing, during the PUSCH transmission opportunity, one of transmission of a PUSCH transmission associated with the HARQ process, transmission of control information based on the received uplink grant, or disregarding the decoded NACK and the received uplink grant.

32. A non-transitory computer-readable medium storing instructions which cause a processor of a user equipment (UE) to perform operations comprising:
   canceling, during a first transmission opportunity of a hybrid automatic repeat request (HARQ) process, a first transmission associated with the HARQ process based on a collision between the first transmission and a measurement gap configured for the UE, wherein a state variable HARQ_FEEDBACK associated with the HARQ process of the UE has a negative acknowledgement (NACK) value, and the cancellation of the first transmission triggers a second transmission in a second transmission opportunity;
   receiving, from a base station, an uplink grant without an associated transport block wherein receipt of the uplink grant triggers a third transmission in the second transmission opportunity; and
   in response to cancellation of the first transmission and receipt of the uplink grant, performing, during the second transmission opportunity that corresponds to the uplink grant, one of transmission of a second transmission associated with the HARQ process, transmission of control information based on the received uplink grant, or disregarding the NACK and the received uplink grant.

* * * * *